(12) United States Patent
Bodiford et al.

(10) Patent No.: US 7,348,381 B2
(45) Date of Patent: Mar. 25, 2008

(54) HIGH MODULUS, HIGH DUCTILITY POLYOLEFINS

(75) Inventors: Bill R. Bodiford, White Oak, TX (US); Lixin Sun, Odessa, TX (US); Gerald Cummings, Longview, TX (US); Pierre Donaldson, Marysville, MI (US); George Allen, Odessa, TX (US)

(73) Assignee: Flint Hills Resources, LP, Wichita, KS (US)

( * ) Notice: Subject to any disclaimer, the term of this patent is extended or adjusted under 35 U.S.C. 154(b) by 0 days.

(21) Appl. No.: 10/491,946

(22) PCT Filed: Oct. 9, 2002

(86) PCT No.: PCT/US02/33401

§ 371 (c)(1),
(2), (4) Date: Aug. 19, 2004

(87) PCT Pub. No.: WO03/031513

PCT Pub. Date: Apr. 17, 2003

(65) Prior Publication Data

US 2005/0027080 A1 Feb. 3, 2005

Related U.S. Application Data

(60) Provisional application No. 60/330,132, filed on Oct. 17, 2001, provisional application No. 60/329,141, filed on Oct. 12, 2001.

(51) Int. Cl.
C08L 23/16 (2006.01)
(52) U.S. Cl. ............... 525/240; 525/53; 526/65; 526/124.9; 526/125.3; 526/348
(58) Field of Classification Search .......... 525/53, 525/240; 526/65, 125.3, 124.9, 348
See application file for complete search history.

(56) References Cited

U.S. PATENT DOCUMENTS

| | | | |
|---|---|---|---|
| 3,922,322 A | 11/1975 | Roger et al. | 260/787 B |
| 4,035,560 A | 7/1977 | Caumartin et al. | 526/124 |
| 4,359,561 A | 11/1982 | Fraser et al. | 526/88 |
| 4,971,937 A | 11/1990 | Albizzati et al. | 502/126 |
| 5,286,791 A | 2/1994 | DeNicola, Jr. et al. | 525/71 |
| 5,476,911 A | 12/1995 | Morini et al. | 526/124.6 |
| 6,100,351 A | 8/2000 | Sun et al. | 526/125.3 |
| 6,262,195 B1 | 7/2001 | Dall'Occo et al. | 526/113 |
| 6,284,833 B1 * | 9/2001 | Ford et al. | 524/515 |
| 6,300,415 B1 * | 10/2001 | Okayama et al. | 525/191 |

FOREIGN PATENT DOCUMENTS

EP 0 361 494 2/1996

OTHER PUBLICATIONS

"Microstructure Distribution of Polypropylenes Obtained in the Presence of Traditional Phthalate/Silane and Novel Diether Donors: A toll for Understanding the Role of Electron Donors in MgCl2-supported Ziegler-Natta Catalysts" Morini et al. in the journal "Macromolecules" 1996, 29, 5770-57767/15/96.
"Diether Based Catalysts: The New Ziegler/Natta Generation for PP" by George van Os given at SPO in 1998.
"Propene polymerization with MgCl2-supported catalysts: effects of using a diether as external donor" by Chadwick et al, from the journal Macromolecul. Chem. Phys. 198, 1181-1188 (1997).

* cited by examiner

*Primary Examiner*—Roberto Rabago
(74) *Attorney, Agent, or Firm*—Gregory N. Clements

(57) ABSTRACT

Provided herein are propylene polymers which are capable of being used as thermoplastic polyolefins just as they emerge from the reactor system described, without further compounding of components which substantially modify the physical properties of the polymers, as such compounding is required of polymers of the prior art. Polymers according to the invention unexpectedly possess both low temperature ductility and high flexural modulus, which properties were related in inverse proportion to one another in the polymers of the prior art.

21 Claims, 1 Drawing Sheet

HIGH MODULUS, HIGH DUCTILITY POLYOLEFINS

TECHNICAL FIELD

This invention relates to polypropylene copolymers and methods for their manufacture. More particularly, it relates to polypropylene copolymers having low temperature impact ductility and high flexural modulus. Polymers made in accordance with the invention are possessed of physical properties which were achievable by prior art teachings only through post-reactor processing steps, which typically include compounding with other chemical polymeric materials. Polymers according to the invention alleviate the need for post-reactor processing to achieve desired properties.

BACKGROUND

The polymerization of various olefins, including propylene, ethylene, and the like has been known in the chemical art for quite some time. Generally speaking, in order to polymerize an olefin, one provides the olefin to be polymerized (the "monomer") and contacts the olefin monomer with a catalytic system under sufficient conditions of temperature, pressure, and composition to cause polymerization of the monomer. The conditions of temperature and pressure may be varied, as well as the type of reaction vessel in which the polymerization is carried out.

One process for polymerization of olefins including, but not limited to propylene is known as the slurry process. In the slurry process, an inert organic solvent is fed into a closed reaction vessel and typically heated, with stirring. Then, a monomeric raw material is fed into the reaction vessel wherein some of the monomer dissolves in the solvent. Catalyst is fed to the stirred reactor and the monomer becomes polymerized. Polymer and solvent may be removed as a slurry, provided that the polymer, by its very nature, has no tendency to stick to the reactor walls, through a pipe in one of the sides or bottom of the reactor. The polymer is then separated by the solvent using means well known to those skilled in the polymer art, and the solvent is recycled. The process may be conducted as a batch process, and the monomer itself may function as the solvent, as in the case when propylene is employed under conditions in which it exists in the liquid state. The slurry process is well-known in the art.

Another process for polymerization of olefins including, but not limited to propylene is known as the gas-phase process. The gas-phase reaction of olefin monomers to form polyolefins is generally conducted in a fluidized bed in the presence of a suitable heterogeneous catalyst. The polymer is then removed from the reactor and further processed using means well known to those skilled in the polymer art. The gas phase or fluidized bed process is most typically conducted in continuous fashion.

Polyolefins are commercially important for their use in diverse products due to the unique combination of chemical and physical properties they may be caused to possess, including, inter alia: chemical inertness, softness, flexibility, and recyclability. These and other of the various properties of polyolefins may be altered, as is known to those skilled in the art, by changing such process variables as catalyst system composition, catalyst concentration, co-catalyst composition, co-catalyst concentration, monomer concentration, monomer composition, temperature of reaction, and hydrogen pressure in the reactor. Since there are so many potential process variables associated with the production of polyolefins, the number of possible combinations of the aforesaid coupled with the large number of chemical compounds available to function as catalyst and co-catalyst have caused the polyolefin chemical arts to become a crowded field of art.

While the physical and mechanical properties of polymers are widely changeable depending upon manufacturing variables, there nevertheless exists a general set of measurements which are commonly used by those in the polymer arts for classifying polymers. Some of the more common measurements and physical properties are: average molecular weight, molecular weight distribution or polydispersity index ("PDI"), MEK soluble fraction, xylene soluble fraction, heptane soluble fraction, Shore D hardness; tensile modulus, tensile stress, melt swell ratio, EP rubber content in the case of ethylene/propylene copolymers, melt flow rate, melt viscosity, VICAT softening point, crystallinity, isotactic pentad content, syndiotactic pentad content, etc.

A number of patents disclose catalysts and processes to prepare non-conventional polyolefins, including U.S. Pat. Nos. 4,524,195; 4,736,002; 4,971,936; 4,335,225; 5,118,768; 5,247,032; 5,565,532; 5,608,018; and 5,594,080, as well as European Patents EP 604908 and 693506, the entire contents of all aforesaid patents being herein incorporated by reference thereto.

Compounded thermoplastic olefin compositions (TPOs) are defined as blends of polypropylene, olefinic elastomers and optionally fillers and other compounding ingredients. TPOs are recognized in the art as being multiphase polymer blends where a polypropylene homopolymer forms a continuous matrix phase and the elastomer and fillers are the dispersed components. The polypropylene homopolymer matrix imparts tensile strength and chemical resistance to the TPO while the elastomer imparts flexibility and impact resistance. Traditionally, ethylene-propylene copolymers (EP) and ethylene-propylene-diene terpolymers (EPDM) have been used as the elastomeric component in TPOs. Recently, other ethylene-alpha olefin copolymers have been used, especially ethylene-butene and ethylene-octene copolymers. Typically, a polypropylene-based TPO material is composed of a high ethylene content polypropylene copolymer resin and the post-reactor addition of a EPDM, EPM, SEBS, EOM, or other suitable rubber to give the final product higher impact properties. Compounding the material post-reactor involves another step and the rubber cannot be dispersed into the polymer matrix at a molecular level as well. The size of the rubber particles are also much larger than those which can be made in the reactor. Chemicals such as peroxide which increase the melt flow rate of the final product are also added, post-reactor.

One major market for TPOs is in the manufacture of automotive parts, especially bumper fascia and other energy-management parts such as pillars. These parts are generally made using injection molding processes. To increase efficiency and reduce costs it is necessary to decrease molding times and reduce wall thickness in the molds. To accomplish these goals, manufacturers have turned to high melt flow polypropylenes (Melt Flow Rate>35). However, these high melt flow rate (MFR) resins are difficult to toughen, resulting in products that have low impact strength.

One of the reasons impact modification by compounding of high MFR polypropylene resins is difficult is because of the large differences in the melt viscosities between the polypropylene resins employed and the elastomers typically used as impact modifiers. These differences lead to a poor dispersion of the elastomer in the polypropylene matrix, resulting in large dispersed elastomer particle sizes which, in turn, is detrimental to overall impact strength.

One proposed solution to the problem has been to decrease the molecular weight of the elastomer used, in order to reduce the viscosity of the elastomer. While this route produces better dispersion of the elastomer in the polypropylene matrix, the reduced molecular weight of the modifier adversely affects the impact strength of the TPO.

Another proposed solution has been to develop products which behave like a low viscosity plastic during the mixing process, yet function like an elastomer in the molded TPO. These type of polymers are generally referred to as plastomers. To date, however, these plastomer products have not yielded satisfactory impact performance when used with high melt flow polypropylene.

A third area that has been explored is the use of branched elastomers. U.S. Pat. No. 5,681,897 discloses the use of substantially linear ethylene-alpha olefin copolymers having a degree of long chain branching as impact modifiers for polypropylene as well as other thermoplastic resins. While the use of these elastomers appears to lead to an improvement in impact strength, there is still a need for impact strength and stiffness in TPOs made with high MFR polypropylene resins.

However, although many workers have tried for decades to provide reactor-grade polymers suitable for employment in applications where TPO's are called for, none have thus far succeeded in providing a thermoplastic polyolefin which simultaneously exhibits excellent impact properties at low temperatures and is possessed of a substantial degree of stiffness. Further, no worker(s) has succeeded in providing such a reactor-grade polymer which additionally has a relatively high melt flow rate ("MFR"), and low xylene-soluble fraction.

By our invention, we have achieved production of such polymers as they emerge from the reactor. For this reason, the polymers of this invention may be referred to as "reactor grade" polymers. The improvement in stiffness of our reactor grade polymers over those available in the prior art will allow a reduction in the level of fillers that are otherwise normally needed to increase the stiffness and flexural modulus of the polymers. This in turn will allow thinner articles to be made which may have been limited in the past due to the melt flow of similar materials being too low or not cost competitive due to post addition of modifiers and the costs associated therewith. The benefit of a high melt flow rate along with the other advantageous properties possessed by the polymers of the present invention will allow the polymers provided herein to be used in thinner-walled and more intricately designed products. A broader molecular weight distribution of the polymers of the present invention gives these polymers better impact to stiffness balance and makes these materials more shear-sensitive, which in turn allows our materials to flow easier under conditions of high shear that are typically experienced in conventional molding practices.

SUMMARY OF THE INVENTION

The invention relates to compatabilizer-free reactor-grade copolymer compositions comprising polypropylene and alpha olefins elastomer, wherein according to one form of the invention the polymers are possessed of the following physical properties when they emerge from the staged reactor system: a) a flexural modulus value of 140 to 215 kpsi as measured by ASTM D-790; b) an instrumented impact ductile failure at −30 degrees C. and 6.7 m/sec. at as measured by test method ASTM D-3673; c) an EP rubber content of any amount in the range of 20-26% by weight based upon the total weight of said copolymer; d) a melt flow rate in the range of 8 to 60 grams per 10 minutes as measured by ASTM D-1238 (230° C./2.16 kg); e) a xylene solubles content of the homopolymer portion having any value in the range of 1.00 to 2.50%, including every hundredth percentage therebetween as measured using the test method outlined in 21 C.F.R. § 177.1520; and f) a polydispersity index (Mw/Mn) greater than 4.5 as measured by ASTM test method D6474 using a single broad polypropylene standard first-order fit calibration.

BRIEF DESCRIPTION OF DRAWING

In the annexed drawing.

DETAILED DESCRIPTION

Figure 1:
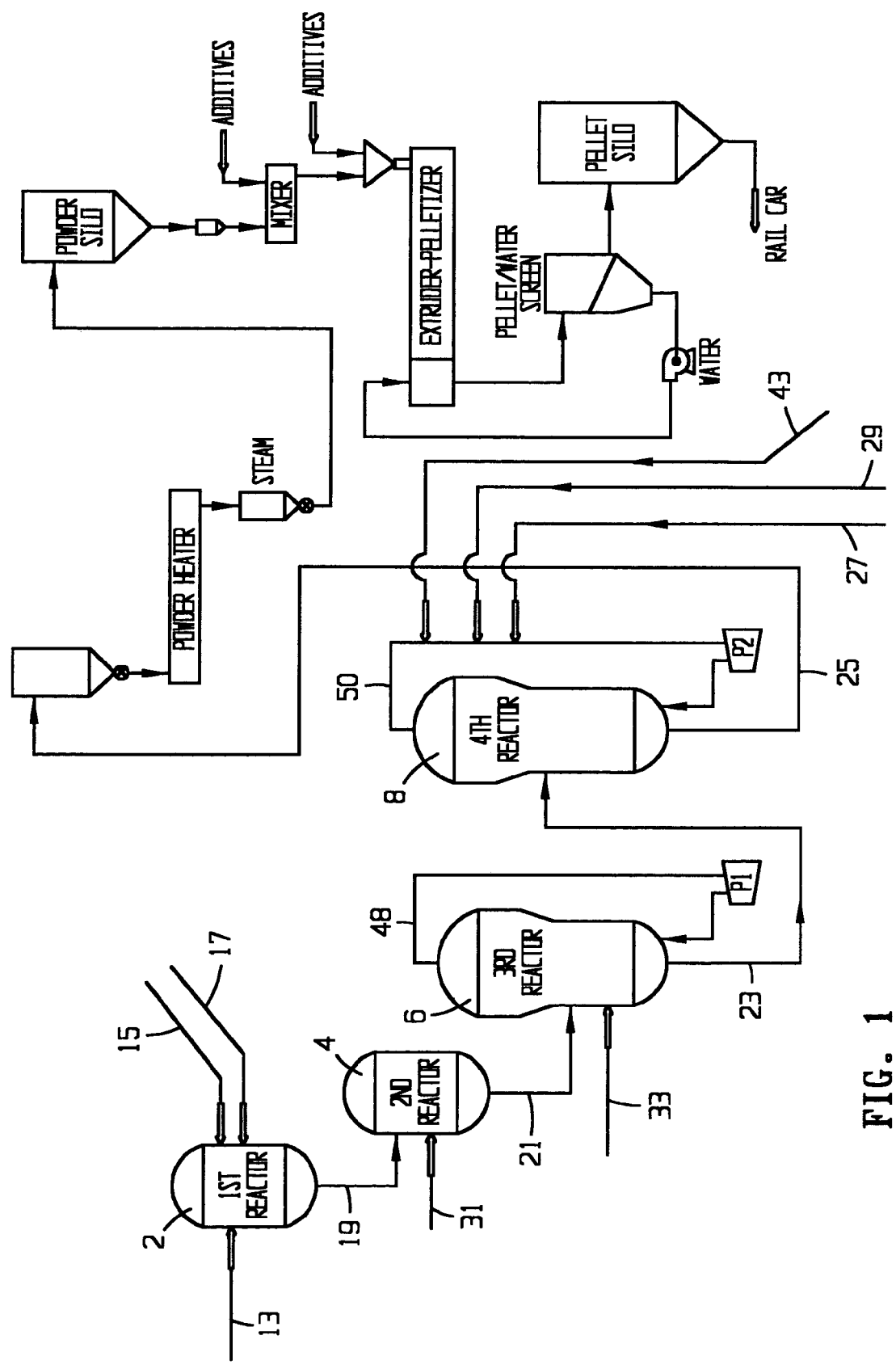
FIG. 1 is a schematic representation of a staged reactor system useful in accordance with the invention.

Referring to the drawings and initially to FIG. 1 there is shown a staged reactor schematic representing the arrangement of the four separate polymerization reactors used in producing the super polymers of this invention. The staged reactor system that is used to prepare the super-polymers of the invention comprises four separate stage reactors, arranged in a series configuration with respect to one another, so that the effluent of one reactor is fed to the next successive reactor as an input.

In FIG. 1 are shown the first stage reactor 2, which is a liquid pool reactor with agitation, the second stage reactor 4, which is a liquid pool reactor with agitation, the third stage reactor 6, which is a fluidized bed gas-phase reactor, and the copolymer reactor 8, which is a fluidized bed gas-phase reactor, arranged in series so that the effluent of the first stage reactor 2 is directed to be fed into the second stage reactor 4, the effluent of which is directed to be fed into the third stage reactor 6, the effluent of which is directed to be fed into the copolymer reactor 8. Each reactor stage in the system has a specific function with respect to the physical properties it confers upon the product it produces. All four stage reactors are equipped with conventional means for controlling the temperature, pressure, and composition within their walls.

FIG. 1 also shows the hydrogen feed 15 and the propylene feed 17 to the first stage reactor 2. The first stage reactor 2 is also equipped with a means 13 for feeding catalyst, cocatalyst, and an external electron donor compound to the reactor, and such feeding means and gas feeds are known to those skilled in the polymer manufacturing art. Conduit 19 serves to convey the material outlet from the first stage reactor 2 as a feed material to the second stage reactor 4. The second stage reactor 4 is equipped with a propylene feed 31 through which additional propylene monomer may be admitted, and a conduit 21 which serves to convey the material outlet from the second stage reactor 4 as a feed material to the third stage reactor 6.

The third stage reactor 6 is equipped with a propylene feed 33 through which additional propylene monomer may be admitted, and a conduit 23 which serves to convey the material outlet from the third stage reactor 6 as a feed material to the copolymer reactor 8. There is a recirculation loop 48 which functions to provide fluidization to the reactor contents by virtue of the operation of blower $P_1$.

The copolymer reactor 8 is equipped with an ethylene feed 29, a propylene feed 27, and a hydrogen feed 43 through which these materials may be admitted, and a conduit 23 which serves to convey the material outlet from the third stage reactor 6 as a feed material to the copolymer reactor 8. In the case of the copolymer reactor, the hydrogen, ethylene, and propylene are added to a recirculating loop 50 that functions to provide fluidization of the reactor contents by virtue of the operation of blower $P_2$. A final polymer product according to the invention exits the copolymer reactor 8 through conduit 25, and is subsequently processed to by means known to those skilled in the art to provide pellets of finished resin.

In a general sense, the homopolymer portion of a finished polymer according to the invention is produced using the first, second, and third stage reactors in achieving a homopolymer having a broad molecular weight distribution and optimized stiffness properties, and towards this end an external donor is preferably employed to maximize the crystallinity of the homopolymer. The impact properties of final polymer products according to the invention result from the ethylene-propylene-rubber (EPR) content, of which the xylene-soluble fraction is an indicator.

During production of the polymers of the invention, it is convenient to use traditional analytical techniques to monitor various properties of the polymers being produced in each reactor. Thus, the total EPR content in the polymer may be readily monitored using Nuclear Magnetic Resonance spectroscopy, as such technique is well-known to those skilled in the art. The ethylene content of the EPR may be readily monitored using Infrared spectroscopy, as such technique is well-known to those skilled in the art. The EPR molecular weight and intrinsic viscosity may be readily monitored using FIPA, as such technique is well-known to those skilled in the art. The EPR intrinsic viscosity and the total ethylene content of the polymer are controlled by the concentration of ethylene and propylene monomers, and the amount of hydrogen in the copolymer reactor 8.

Throughout the present process, propane is seen to be present. Propane present I in a process according to the invention is present as an impurity in the propylene feed, and it is generally desirable to remove as much propane by distillation prior to the use of the propylene in a polymerization according to the invention.

The First Stage Reactor

The first stage reactor in the system used for providing the polymers according to the invention is operated as a liquid pool reactor. The feedstock materials which are admitted to the first stage reactor comprise: a catalyst; a cocatalyst; an external donor; hydrogen; and propylene. It is in this first stage reactor 2 that the main propylene homopolymer backbone is first created, and reaction conditions are controlled so that the polymer which exits the first stage reactor 2 has a melt flow rate ("MFR") of any value in the range of 700-1600 g/10 min. (ASTM D-1238). The preferred conditions in the first stage reactor are: 1) reactor temperature is any temperature in the range of between 65° C. and 74° C.; 2) The temperature of the gas in the reactor is between 54.4° C. and 71° C.; 3) the total pressure inside the reactor may be any pressure between 510 and 580 psig; 4) the residence time in the reactor is any amount of time between 0.50 and 0.90 hours; and 6) the gas composition inside the reactor, on a molar ratio of the particular gas-to-propylene basis, is: hydrogen 0.28 to 0.80; and propane 0-0.40. The slurry of liquid propylene/polymer/catalyst that is produced in the first stage reactor 2 is continuously transferred from the first stage reactor 2 to the second stage reactor 4.

The Second Stage Reactor

The second stage reactor in the system used for providing the polymers according to the invention is operated as a liquid pool reactor. Propylene is the only monomer feed to the second stage reactor 4. The second stage reactor 4 is operated very similarly to the first stage reactor except at lower hydrogen/propylene ratio. The preferred conditions in the second stage reactor are: 1) reactor temperature is any temperature in the range of between 65° C. and 74° C.; 2) The temperature of the gas in the reactor is between 60° C. and 74° C.; 3) the total pressure inside the reactor may be any pressure between 490 and 530 psig; 4) the residence time in the reactor is any amount of time between 0.30 and 0.50 hours; and 5) the gas composition inside the reactor, on a molar ratio of the particular gas-to-propylene basis, is: hydrogen 0.06 to 0.28; and propane 0-0.28. The hydrogen present in the second stage reactor is that quantity which has been dissolved in the liquid propylene and carried over in the polymer/propylene slurry from the first stage reactor. The polymer which exits the second stage reactor 4 has a melt flow rate ("MFR") of any value in the range of 400-800 g/10 min. (ASTM D-1238). After the second stage reactor 4 the propylene/polymer slurry (containing active catalyst) was transferred to the third stage reactor 6.

The Third Stage Reactor

The third stage reactor in the system used for providing the polymers according to the invention is operated as a gas phase, fluidized bed reactor. Propylene is the only monomer feed to the third stage reactor 6. In the third stage reactor 6 there are polymer/catalyst powder and gaseous propylene and hydrogen. The preferred conditions in the third stage reactor are: 1) reactor temperature is any temperature in the range of between 62° C. and 74° C.; 2) The temperature of the gas in the reactor is between 71° C. and 85° C.; 3) the total pressure inside the reactor may be any pressure between 250 and 290 psig; 4) the residence time in the reactor is any amount of time between 0.25 and 0.50 hours; and 5) the gas composition inside the reactor, on a molar ratio of the particular gas-to-propylene basis, is: hydrogen 0.01 to 0.12; and propane 0-0.12.

The hydrogen present in the third stage reactor is that quantity which has been carried over with the polymer/propylene slurry from the second stage reactor. The polymer which exits the third stage reactor 6 has a melt flow rate ("MFR") of any value in the range of 50-200 g/10 min. (ASTM D-1238).

The Copolymer Reactor

The copolymer reactor in the system used for providing the polymers according to the invention is operated as a gas phase, fluidized bed reactor. Propylene and ethylene are both used as monomers for feed to the copolymer reactor 8. In the copolymer reactor 8 there are polymer/catalyst powder, gaseous propylene, gaseous ethylene, and hydrogen, and it is in the copolymer reactor that the EP rubber portion of the polymers according to the invention are formed. The preferred conditions in the copolymer reactor are: 1) reactor temperature is any temperature in the range of between 62° C. and 77° C.; 2) the temperature of the gas in the reactor is between 68° C. and 77° C.; 3) the total pressure inside the reactor may be any pressure between 120 and 220 psig; 4) the residence time in the reactor is any amount of time between 0.70 and 1.20 hours; 5) the gas composition inside the reactor, on a molar ratio of the particular gas-to-propylene basis, is: hydrogen 0.01 to 0.10; ethylene 0.30 to 1.0 and propane 0-0.25. The polymer which exits the copolymer reactor 8 has a melt flow rate ("MFR") of any value in the range of 20-100 g/10 min. (ASTM D-1238).

Thus, in a process according to the invention, propylene is the only monomer feed in the second stage reactor 4 and in the third stage reactor 6. In practice, the slurry of liquid propylene/polymer/catalyst is continuously transferred from the first stage reactor 2 to the second stage reactor 4. Thus, the second stage reactor 4 is operated very similarly to the first stage reactor 2, except the second stage reactor is operated at a lower hydrogen/propylene ratio. After the second stage reactor 4 the liquid propylene/polymer slurry is transferred to the third stage reactor 6. Therefore, the third stage reactor 6 contains polymer/catalyst powder, gaseous propylene, and hydrogen.

The Catalyst

The catalysts which may be used in preparing the polymers of the present invention comprise the product of the reaction between: a) a solid component comprising a compound of a transition metal selected from the group consisting of titanium, hafnium, zirconium, or vanadium, and supported on a halide of magnesium in active form, and comprises one or more internal electron donor(s) which may be selected from diesters and/or 1,3 diethers; b) an alkyl aluminum compound; and c) an external electron donor. Halides of magnesium in active form, preferably $MgCl_2$ which are used as a support for Ziegler-Natta catalysts, are well known from the literature. U.S. Pat. Nos. 4,298,718 and 4,495,338 first described the use of these compounds as support for Ziegler-Natta catalysts, as well as other later US Patents such as U.S. Pat. No. 6,262,195. The contents of these patents are fully incorporated herein by reference thereto.

The compound of the transition metal is selected preferably from the group consisting of halides of titanium, halogen-alcoholates of titanium, $VCl_3$, $VCl_4$, $VOCl_3$ and halogen-alcoholates of vanadium.

Among the titanium compounds, the preferred are $TiCl_4$, $TiCl_3$ and the halogen-alcoholates of formula $Ti(OR)_r X_s$, wherein R is a $C_1$-$C_{12}$ hydrocarbon radical, or is a group—COR; X is halogen and (r+s) is equal to the oxidation state of Ti. Titanium tetrachloride is especially preferred.

The catalytic component (a) is advantageously used in the form of controlled particle morphology with mean diameter ranging from about 10 and 150 microns. Suitable methods for the preparation of said components in desired particle form are reported for instance in European patent applications EP 0 395 083, EP 0 553 805, EP 0 553 806 and in U.S. Pat. Nos. 4,399,054; 4,469,648; and 4,816,433.

The internal donor(s) optionally present in the catalytic component (a) can be selected from the group consisting of: ethers, esters (preferably esters of a polycarboxylic acid), amines, ketones. Preferably, the internal donor is a 1,3-diether of the type described in European patent applications EP 0 361 493, EP 0 361 494, EP 0 362 705 and EP 0 451 645. Preferable diethers include, without limitation the 2,2-dialkyl-1,3-dimethoxypropanes, such as: 2,2-diisobutyl-1,3-dimethoxypropane; 2-isopropyl-2-isopentyl-1,3-dimethoxypropane; 2,2-bis(cyclohexylmethyl)-1,3-dimethoxypropane, 2-isopropyl-2-isoamyl-1,3-dimethoxypropane. According to one preferred form of the invention, the catalyst comprises both diester and diether internal donors.

The alkyl-Al compound (b) is preferably a trialkyl aluminum compound, such as triethyl-Al, triisobutyl-Al, tri-n-butyl-Al, tri-n-hexyl-Al, tri-n-octyl-Al and triisooctyl-Al. It is also possible to use mixtures of trialkyl-Al's with alkyl-Al halides, alkyl-Al hydrides or alkyl-Al sesquichlorides, such as $AlEt_2Cl$ and $Al_2Et_3Cl_3$. In one preferred embodiment of the invention, the aluminum compound is a trialkyl aluminum, such as triethylaluminum.

The external donor present with the catalytic component (c) can be the same or different from the internal donor, but is preferably different. The external donor is preferably a silicon compound of formula $R_2R_2 Si(OR_2)_2$, wherein the groups $R_2$, the same or different from each other, are $C_1$-$C_{18}$ alkyl, cycloalkyl, or aryl radicals. Particularly advantageous examples of such silanes are methylcyclohexyl dimethoxysilane, diisopropyldimethoxysilane, diphenyldimethoxysilane, methyl-t-butyldimethoxysilane and dicyclopentyldimethoxysilane. In one preferred embodiment, when the aluminum alkyl is triethyl aluminum, the external donor is selected from the group consisting of: methylcyclohexyldimethoxysilane or dicyclopentyldimethoxysilane.

The combined total amount of polymer produced in the first, second, and third stage reactors is generally greater than 1000 g/g of solid catalyst component, preferably greater than 2000 g/g, more preferably greater than 3000 g/g. The combined total amount of polymer produced in the first, second, and third stage reactors is preferably between 10 and 90% by weight relative to the total amount of polymer produced in the copolymer reactor, and more preferably is between 20 and 80%.

EXAMPLE 1

High-rubber propylene polymers according to the invention were prepared using the four-stage reactor apparatus as herein described, using the conditions outlined below:

| | First | Second | Third | Co-polymer |
|---|---|---|---|---|
| Reactor Stage | | | | |
| Reactor Temperature (° F.) | 160 | 156 | 157 | 127 |
| Gas Temperature (° F.) | 152 | 145 | 176 | 160 |
| Pressure (psig) | 510 | 462 | 281 | 196 |
| Residence Time (hrs.) | 0.77 | 0.54 | 0.43 | 0.71 |
| Ratio of total polymer production | 0.22 | 0.17 | 0.29 | 0.32 |
| Gas Composition molar ratio Hydrogen/propylene | 0.42 | 0.13 | 0.02 | 0.02 |
| Propane/propylene | 0.05 | 0.06 | 0.08 | 0.19 |
| Ethylene/propylene | — | — | — | 0.70 |
| Melt Flow Rate g/10 min. ASTM D-1238 | 273 | 193 | 42 | 15 |
| Cocatalyst/catalyst ratio (Al/Ti mole/mole) | 45/1 | | | |
| Ext. Donor/catalyst ratio (Si/Ti mole/mole) | 13/1 | | | |
| Finished Polymer Properties | | | | |
| Melt Flow Rate (ASTM D-1238) g/10 min. | 10.6 | | | |
| EP Rubber Content (wt. %) | 19.04 | | | |
| Total Ethylene (mol %) | 16.7 | | | |
| EP Rubber intrinsic viscosity (dL/g) | 2.3 | | | |
| Rockwell Hardness (R scale) | 91 | | | |
| HDT @ 66 psi | 79 C. | | | |
| HDT @ 264 psi | 51 C. | | | |
| Gardner Impact @ −30° C./(in/lbs) | 316 | | | |
| INST. Impact @ −30° C./ 15 mph J @ maxload | 18.9 | | | |
| INST. Impact @ −18° C./15 mph | Ductile | | | |

-continued

|  | First | Second | Third | Co-polymer |
|---|---|---|---|---|
| (failure) |  |  |  |  |
| Tensile Strength @ 50 mm/min | 3170 |  |  |  |
| Elongation @ yield (%) | 7 |  |  |  |
| Flexural Modulus Tan 5 (k psi) | 169 |  |  |  |
| Notched IZOD @ $T_{room}$ (ft-lbs/in.) | 3.18 |  |  |  |

EXAMPLE II

|  | First | Second | Third | Co-polymer |
|---|---|---|---|---|
| Reactor Stage |  |  |  |  |
| Reactor Temperature (° F.) | 152 | 162 | 154 | 134 |
| Gas Temperature (° F.) | 145 | 154 | 176 | 164 |
| Pressure (psig) | 563 | 513 | 282 | 257 |
| Residence Time (hrs.) | 0.62 | 0.39 | 0.37 | 0.79 |
| Ratio of total polymer production | 0.18 | 0.15 | 0.27 | 0.40 |
| Gas Composition molar ratio  Hydrogen/propylene | 0.53 | 0.11 | 0.02 | 0.05 |
| Propane/propylene | 0.03 | 0.04 | 0.06 | 0.06 |
| Ethylene/propylene | — | — | — | 0.59 |
| Melt Flow Rate g/10 min ASTM D-1238 | 1415 | 630 | 91 | 35 |
| Cocatalyst/catalyst ratio (Al/Ti mole/mole) | 55/1 |  |  |  |
| Ext. Donor/catalyst ratio (Si/Ti mole/mole) | 9/1 |  |  |  |
| Finished Polymer Properties |  |  |  |  |
| Melt Flow Rate (ASTM D-1238) g/10 min. | 22.9 |  |  |  |
| EP Rubber Content (wt. %) | 23.43 |  |  |  |
| Total Ethylene (mol %) | 18.3 |  |  |  |
| EP Rubber intrinsic viscosity (dL/g) | 2.2 |  |  |  |
| Rockwell Hardness (R scale) | 81 |  |  |  |
| HDT @ 66 psi | 75 C. |  |  |  |
| HDT @ 264 psi | 45 C. |  |  |  |
| Gardner Impact @ −30° C./(in/lbs) | 320 |  |  |  |
| INST. Impact @ −30° C./ 15 mph J @ maxload | 23.6 |  |  |  |
| INST. Impact @ −18° C./15 mph (failure) | Ductile |  |  |  |
| Tensile Strength @ 50 mm/min | 2680 |  |  |  |
| Elongation @ yield (%) | 6 |  |  |  |
| Flexural Modulus Tan 5 (k psi) | 142 |  |  |  |
| Notched IZOD @ $T_{room}$ (ft-lbs/in.) | 11.64 |  |  |  |
| IZOD @ −30° C. | 1.8 |  |  |  |

For each of the polymers prepared in Example I and Example II the catalyst employed is the catalyst prepared in the "catalyst preparation" section below. In each of the Example I and Example II the cocatalyst is triethylaluminum. In each of Example I and Example II the external donor is dicyclopentyldimethoxysilane. The row labeled "ratio of total polymer production" in each of the Examples tables sets forth in decimal form the portion of polymer produced in each reactor based upon the total amount of polymer produced in the overall four-stage process.

Catalyst Preparation

The catalyst used in Example I and Example II above was prepared according to the following procedure. Ten grams of anhydrous $MgCl_2$ and 300 ml of toluene were charged under a nitrogen atmosphere to a one-liter flask equipped with mechanical agitator. Next, using moderate agitation, 20 ml of tetrahydrofuran and 19 ml of butanol were added. The temperature inside the flask was slowly raised to 105° C. and contents of the flask were maintained at this temperature for 2 hours, after which a homogeneous solution was seen to be formed. Next, the solution was cooled to room temperature, and 15 ml of $TiCl_4$ was added dropwise to the solution under moderate agitation. After completion of the addition of the $TiCl_4$, the temperature was raised to 90° C. and reaction was kept at 90° C. for one hour. The agitation was stopped, and the resulting solid components were permitted to settle to the bottom of the flask. The supernatant liquid was removed and the solid was twice washed with 100 ml aliquots of toluene. 100 ml of fresh toluene and 100 ml of $TiCl_4$ were subsequently added to the solid, and the mixture was heated to 110° C. under agitation and kept at 110° C. for 1 hour. Again, the agitation was stopped and the supernatant was removed. Then 100 ml of toluene, 100 ml of $TiCl_4$ and 1.0 ml of diisobutylphthalate were charged to the solid and the mixture was heated up to 115° C. After reaction at 115° C. for 1 hour, agitation was stopped and the supernatant was removed. The solid was washed with 100 ml of toluene at 60° C. for 30 minutes and the supernatant was removed. Then, the solid was cooled down to ambient temperature. 200 ml of $TiCl_4$ and 4.0 ml of 2,2-diisobutyl-1,3-dimethoxypropane were added to the solid and temperature was raised to 100° C. After reaction at 100° C. for 2 hours, agitation was stopped and the supernatant was removed. Finally 200 ml of fresh $TiCl_4$ was added to the solid and the mixture was heated at 120° C. for 1 hour. Then the supernatant was removed. The residual solid was washed with 200 ml of anhydrous heptane at 60° C. for 6 times and then dried under vacuum to yield the useful catalyst components in the solid form.

Other preferable catalysts suitable for use in the present invention may be produced using equimolar amounts of other 1,3-diethers in the place of the 2,2-diisobutyl-1,3-dimethoxypropane, in the preparation above. Combinations of such other diethers may also be employed. Further diethers useful in preparing catalysts useful in producing polymers according to the invention are set forth in EP 0 451 645, which is herein incorporated by reference thereto. Other compounds useful in the place of the 2,2-diisobutyl-1,3-dimethoxypropane cited in the preparatory method above include: 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)indene; 1,1-bis(methoxymethyl)-2,3-dimethylindene; 1,1-bis(methoxymethyl)-4,7-dimethylindene; 1,1-bis(methoxymethyl)-4-phenyl-2-methylindene; 1,1-bis(methoxymethyl)-7-(3,3,3-trifluoropropyl)indene; 1,1-bis(methoxymethyl)-7-trimethylxylylindene; 1,1-bis(methoxymethyl)-7-trifluoromethylindene; 1,1-bis(methoxymethyl)-7-methylindene; 1,1-bis(methoxymethyl)-7-cyclopenthylindene; 1,1-bis(methoxymethyl)-7-isopropylindene; 1-bis(methoxymethyl)-7-cyclohexylindene; 1-bis(methoxymethyl)-7-tert-butylindene; 1-bis(methoxymethyl)-7-tert-butyl-2-methylindene; 1-bis(methoxymethyl)-7-phenylindene; 1-bis(methoxymethyl)-2-phenylindene; 9-bis(methoxymethyl)fluorene; 9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8- dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; and 9,9-bis(methoxymethyl)-4-tert-butylfluorene, and combinations of the foregoing.

The identity and use of various nucleating agents as additives in the processing of polymers is well-known in the art, and nucleants may be used with the polymers of the invention prior to the pelletizing process. One preferred nucleant useful as an additive to the polymers of the present invention is known as NA-11, which is a proprietary sodium phosphate salt available from Amfine Chemical Corporation. To use this nucleant, one adds 0.5 to 3.5 grams of the nucleant for every kilogram of polymer. Preferably, the nucleant is added to the extruder during a pelletizing process, as such addition is well-known to those skilled in the art.

The identity and use of various anti-oxidants as additives in the processing of polymers is well-known in the art, and known anti-oxidants may be used with the polymers of the invention prior to the pelletizing process. Polymers are generally sensitive to thermal degradation, and it is noticed that the absence of antioxidants in the polymers of the invention when they emerge from the copolymer reactor yields a melt flow rate which is higher in general than the melt flow rate measured for the same polymer which contains an anti-oxidant. This is believed to be the case because the melt flow rate involves heating the sample to an elevated temperature, and, for samples which are heated in the absence of an anti-oxidant, degradation may occur which results in a higher melt flow rate. Thus, it is imperative to add a suitable anti-oxidant to the polymer after it emerges from the copolymer reactor prior to pelletizing or conducting any melt flow rate testing if accurate values are to be obtained. One preferred anti-oxidant useful as an additive to the polymers of the present invention is known as IRGANOX® 1010, which is available from Ciba Specialty Chemicals Corp. To use this anti-oxidant, one adds 1.0-2.0 grams of the anti-oxidant for every kilogram of polymer. Preferably, the anti-oxidant is added to the extruder during a pelletizing process, as such addition is well-known to those skilled in the art. Other anti-oxidants recognized by those skilled in the art as being useful as additives to olefin polymers are useful as additives with the polymers of this invention.

During processes for producing the polymers outputted at each reactor stage described herein, conventional control of variables which effect the physical properties of the polymers produced at each stage are available to operator of such a process. Variables such as the total amount of hydrogen admitted at each stage, including its rate of addition (to control molecular weight and hence MFR), monomer content, hydrogen to monomer ratio, presence of co-polymers, quantity of co-polymers, temperature, catalyst injection rates, and all other variables generally known to those skilled in the art of polymer processing may be employed to affect the physical properties of the polymer produced at each reactor stage. The teachings of the present invention include the fact that at each reactor stage, variables recognizable by those skilled in the art as having a particular effect on a given physical property of a polymer produced at each stage (such as melt flow rate) in general during a polymerization, also affect the polymers of the present invention at each stage in the same way as in conventional polymers. That is to say, addition of more hydrogen generally results in a lower molecular weight polymer being produced, having an attendant higher melt flow rate. Thus, it is readily achievable by one of ordinary skill in the art to produce polymers having a wide range of physical properties at each stage as taught herein, by the adjustment of conventional parameters, so as to arrive at a finished polymer having physical properties within all of the ranges specified in the claims appended to this application, without undue experimentation, as is immediately recognized by one of ordinary skill in the polymer arts.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. This includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the contents of this specification.

What is claimed is:

1. A polymer that comprises a polypropylene homopolymer portion and an EP rubber portion interspersed therein, further comprising:
   a) a flexural modulus value of any value in the range of 140 to 215 Kpsi;
   b) an instrumented impact ductile failure at −30° C. and 6.7 m/s;
   c) an EP rubber content of any amount in the range of 18.00-26.00% by weight, including every hundredth percentage therebetween based upon the total weight of said polymer;
   d) a melt flow rate in the range of any value in the range of 10.00 to 40.00 grams per 10 minutes, including every hundredth gram per 10 minutes therebetween;
   e) a xylene-soluble fraction content of the homopolymer portion of any value in the range of 1.00 to 2.50%, including every hundredth percentage therebetween; and
   f) a total ethylene content of any amount in the range of 15.00 to 20.00 molar percent, including every hundredth molar percentage therebetween.

2. A polymer according to claim 1 having a flexural modulus of any value in the range of 140 to 195 Kpsi.

3. A polymer according to claim 1 having an EP rubber content of at least 20% by weight based upon the total weight of said polymer.

4. A polymer according to claim 1 having a melt flow rate in the range of any value in the range of 10.00 to 35.00 grams per 10 minutes, including every hundredth gram per 10 minutes therebetween.

5. A polymer according to claim 1 having a melt flow rate in the range of any value in the range of 20.00 to 30.00 grams per 10 minutes, including every hundredth gram per 10 minutes therebetween.

6. A process for producing a predominantly polypropylene polymer having a flexural modulus value of any value in the range of 140 to 215 Kpsi; an instrumented impact ductile failure at −30° C. and 6.7 m/s; an EP rubber content of any amount in the range of 18-26% by weight based on the total weight of said polymer; a melt flow rate in the range of any value in the range of 10.00 to 35.00 grams per 10 minutes, including every hundredth gram therebetween; an EP rubber fraction having intrinsic viscosity of 2.1 to 2.8 dL/g, said process comprising:
  a) providing first stage, second stage, third stage, and copolymer stage reactors each having an inlet and an outlet, wherein the outlet of said first, second and third stage reactors are in selectable fluid contact with the inlets of each of said second, third, and copolymer stage reactors, respectively;
  b) providing propylene, hydrogen, a polymerization catalyst, a co-catalyst, and an external donor to said first stage reactor sufficient to provide a first propylene polymer having a Melt Flow Rate of at least 400 grams per 10 min.;
  c) transmitting the polymer produced in the first stage reactor to said second stage reactor;
  d) providing propylene to said second stage reactor sufficient to provide a second propylene polymer having a Melt Flow Rate in the range of about 100 to 800 grams per 10 min.;
  e) transmitting the polymer produced in the second stage reactor to said third stage reactor;
  f) providing propylene to said third stage reactor sufficient to provide a third propylene polymer having a Melt Flow Rate in the range of about 20 to 200 grams per 10 min.;
  g) transmitting the polymer produced in the third stage reactor to said copolymer reactor;
  h) producing a final polymer product by providing propylene, ethylene, and hydrogen to said copolymer reactor sufficient to incorporate ethylene-propylene rubber into said third propylene polymer in an amount in the range of 18.00% to 26.00%, including every hundredth percentage therebetween, based upon the total weight of said final polymer when it exits said copolymer reactor, said final propylene polymer having a Melt Flow Rate in the range of about 10-35 grams per 10 min.; and
  i) collecting said final polymer from said outlet of said copolymer reactor.

7. A process according to claim 6 wherein said catalyst comprises a diether component which is a 2,2-dialkyl-1,3-dimethoxypropane.

8. A process according to claim 6 wherein said catalyst comprises a diether component selected from the group consisting of: 2,2-diisobutyl-1,3-dimethoxypropane; 2-isopropyl-2-isopentyl-1,3-dimethoxypropane; and 2,2-bis(cyclohexylmethyl)-1,3-dimethoxypropane.

9. A process according to claim 6 in which said cocatalyst is an aluminum trialkyl.

10. A process according to claim 9 wherein said aluminum trialkyl is selected from the group consisting of an aluminum compound in which an aluminum atom has three alkyl groups bonded to it, and mixtures of aluminum trialkyl and aluminum alkyl, wherein said three alkyl groups attached to the aluminum atom are each independently selected from the group consisting of: methyl, ethyl, propyl, isopropyl, butyl, sec-butyl, isobutyl, pentyl, 2-pentyl, 3-pentyl, neopentyl, and n-hexyl; and
wherein said aluminum alkyl is selected from the group consisting of alkyl-Al halides, alkyl-Al hydrides, and alkyl-Al sesquichlorides.

11. A process according to claim 10 in which the aluminum trialkyl is triethyl aluminum.

12. A process according to claim 6 in which said external donor is an organosilane compound.

13. A process according to claim 12 in which said organosilane compound is dicyclopentyldimethoxysilane.

14. A process according to claim 6 in which said external donor is dicyclopentyldimethoxysilane, said co-catalyst is triethyl aluminum, said catalyst comprises a diether component, and the melt flow rate of the final propylene polymer is any value in the range of about 10-35 grams per 10 min. and further comprising the steps of:
  j) adding an anti-oxidant to said final polymer; and
  k) forming said final polymer into pellets.

15. A process according to claim 14 in which said diether component is selected from the group consisting of: 2,2-diisobutyl-1,3-dimethoxypropane; 2-isopropyl-2-isopentyl-1,3-dimethoxypropane; and 2,2-bis(cyclohexylmethyl)-1,3-dimethoxypropane.

16. A process for producing a molded article for a motor vehicle comprising the steps of:
  a) providing a reactor-grade thermoplastic olefin polymer that comprises a polypropylene homopolymer portion and an EP rubber portion interspersed therein, further comprising:
    i) a flexural modulus value of any value in the range of 140 to 215 Kpsi;
    ii) an instrumented impact ductile failure at −30° C. and 6.7 m/s;
    iii) an EP rubber content of any amount in the range of 18.00-26.00% by weight, including every hundredth percentage therebetween based upon the total weight of said polymer;
    iv) a melt flow rate in the range of any value in the range of 10.00 to 35.00 grams per 10 minutes, including every hundredth gram per 10 minutes therebetween;
    v) a xylene-soluble fraction content of the homopolymer portion of any value in the range of 1.00 to 2.50%, including every hundredth percentage therebetween; and
    vi) a total ethylene content of any amount in the range of 15.00 to 20.00 molar percent, including every hundredth molar percentage therebetween;
  b) providing a mold;
  c) determining the degree of shrinkage desired for a selected set of molding conditions;
  d) molding said article using said selected set of molding conditions.

17. A process according to claim 16 wherein said molded article is selected from the group consisting of bumpers, fascias, or interior head impact parts.

18. A process according to claim 16 wherein said molded article is produced by injection molding.

19. A molded article produced using the process of claim 16, wherein said molded article is selected from the group consisting of: bumpers, fascias, or interior head impact parts.

20. A reaction scheme for producing a polymer having the physical properties set forth in claim 1, said reaction scheme comprising:
  a) producing a polyolefin polymer in a first liquid pool reactor by reacting propylene monomer in the presence of a Ziegler-Natta polymerization catalyst;
  b) conveying said polymer produced in said first liquid pool reactor to a second liquid pool reactor, and admitting propylene monomer to said second liquid pool reactor in the presence of a Ziegler-Natta polymerization catalyst;
  c) conveying said polymer produced in said second liquid pool reactor to a first gas-phase reactor, and admitting propylene monomer to said first gas-phase reactor in the presence of a Ziegler-Natta polymerization catalyst;
  d) conveying said polymer produced in said first gas-phase reactor to a second gas-phase reactor, and admitting propylene monomer and ethylene monomer to said second gas-phase reactor in the presence of a Ziegler-Natta polymerization catalyst.

21. A polymer produced according to the reaction scheme of claim 20, wherein the polymer produced has a melt flow rate of any value in the range of 10 to 35 grams per 10 minutes.

* * * * *